Patented Dec. 23, 1952

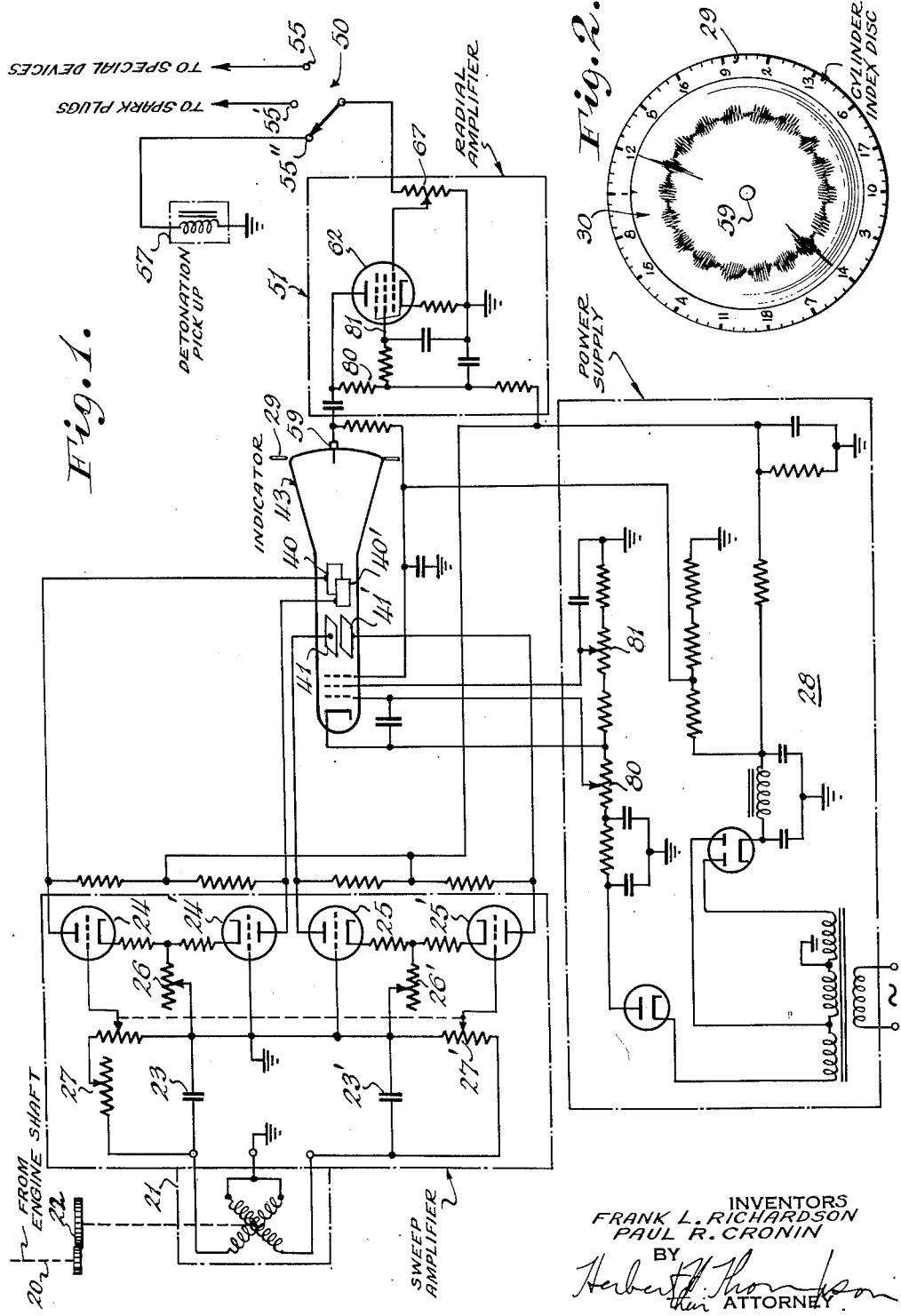

2,622,441

UNITED STATES PATENT OFFICE 2,622,441

INTERNAL-COMBUSTION ENGINE POWER ANALYZER

Frank L. Richardson, Hicksville, and Paul R. Cronin, Elmhurst, N. Y., assignors to The Sperry Corporation, a corporation of Delaware Application March 15, 1947, Serial No. 735,040

5 Claims. (Cl. 73—116)

This invention relates to improvements in apparatus and methods including means for analyzing power conditions of prime movers having particular reference to internal combustion engine analyzers for determining faults and operating conditions thereof in order to effectively maintain the operation of such engines at maximum power output and efficiency.

Although this invention permits the operation of internal combustion engines to better advantage, it has special value when used to analyze the operation of engines in mobile vehicles either singly or in multiple units, so as to determine their proper operation and capabilities.

For this reason the invention has been described herein specifically as applied to such engines though the use thereof is in no wise thus limited.

The need for simple and accurate means for the detection and location of troubles which develop in mobile craft engines has become increasingly apparent. Methods presently in use are at best approximate and inconclusive and have remained substantially unchanged since the beginning of the mobile craft industries.

Presently known methods adapted to determine engine and power faults consist of, in most instances, trial and error expedients in which the diagnosis of faults depends upon the particular skill of the technician involved. These trial and error methods have been found to be completely inadequate when applied to the types of vehicles which are now in use because of the tremendous increase in the number of components which need to be analyzed and the difficulties which are thus encountered.

In the past few years, multi-cylinder engines of great power have come from the development laboratories for use in standard types of automobiles and aircraft. These engines run at high indicated pressures, and, in aircraft, for example, use dual ignition systems to attain increased fuel burning rates, and to obtain additive factors of safety in case of damage to one ignition system.

Thus, it is often a tedious and time consuming task for the technician to locate the source of trouble in these engines by means of the expedients presently available.

For example, in an aircraft employing an 18-cylinder engine including 36 spark plugs, if the engine is operating badly, a routine inspection may lead the technician to believe that some of the spark plugs may be fouled. The technician proceeds, serially, to remove all of the plugs, physically to inspect them for fouling, and to replace what appears to be the defective plugs. This results in considerable loss of time and effort.

But, this inspection may be useless, for the technician may find even after such inspection in search of a remedy that the difficulty is actually in some other component, for example, in the magneto or in the engine harness rather than in the spark plugs. Thus, it may be necessary to test the harness by means of a high tension voltage leakage check or a low tension continuity check. Further, these spark plugs may warrant inspection in a high pressure chamber for cracked porcelain, fouling, etc.

It is apparent, therefore, that as the size, speed and cost of mobile craft increase, the task of keeping engines operative becomes increasingly important.

The present invention discloses in a preferred embodiment quick, accurate, portable, and electrical means for determining the operating conditions of components of the ignition system of an internal combustion engine without disturbing the engine's electrical wiring, or in any way affecting its performance.

The present apparatus provides continuous analysis of complete power plants either on the ground, as for automobiles, and/or in flight, as for aircraft. Thus, the analyzer which includes pictorial indicating means enables an operator to obtain a complete, visual and overall picture of the conditions of a craft's engines at any time during operation. By means of a polar-coordinate indicator, the angular position of predetermined electrical delineations or characterizing patterns are observed in the screen of a cathode-ray tube and thus represent where at such conditions of engine combustion ignition system performance, etc. occur.

From these characteristic patterns, the operator may detect, locate and identify malfunctions which may occur during the operation of the power plants. Moreover, these patterns are available simultaneously for all cylinders in a power plant in order to permit the immediate adjustment of the power plant for optimum performance.

The prime object, therefore, of the present invention is to provide simple means for analyzing engine faults and for checking performance in either single engines or in multiple engine combinations of power plants.

Another object of this invention is to allow for the detection and location of engine ignition faults.

A further object of the invention is to detect and locate fuel injection, carburetor or air induction system failures.

A further object of the invention is to make possible the determination of the crankshaft angle at which an ignition event takes place for placement of the crankshaft in proper cyclic position so as to permit the making of various maintenance adjustments.

Yet another object of the invention is to make possible detection and location of detonation in any cylinder of a power plant.

A further object of the invention is to determine the place of failure or misadjustment of the combustion system of an engine.

The invention in another of its aspects relates to novel features of the instrumentalities described herein for achieving the principal objects of the invention and to novel principles employed in those instrumentalities, whether or not these features and principles are used for the said principal objects or in the said field.

Other objects of the invention and the nature thereof will become apparent from the following description considered in connection with the accompanying drawings, wherein like reference characters describe elements of similar function, and the scope of the invention is determined from the appended claims.

Referring to the drawings:

Fig. 1 is a wiring diagram of a power plant analyzer system illustrative of a preferred embodiment of the present invention;

Fig. 2 is an illustration of a characteristic combustion pattern as placed along the circular sweep of the polar coordinate indicator used in the present embodiment of the invention.

In testing internal combustion engines and other such apparatus, it is extremely important to be able to analyze the operating characteristics of these engines and to positionally determine where any operative event or condition exists during the engine cycle as given by the rotation of its crankshaft.

The novel power plant analyzer, hereinafter described, uses a cathode ray tube indicator to place voltages indicative of conditions in the cylinders of a craft's engine along a circular sweep or trace according to the crankshaft angle of said engine.

The present engine power analyzer provides a polar coordinate graph on the face of a cathode ray tube indicator whereby crankshaft angular position of any event, for example, combustion or detonation, may be readily identified and analyzed.

To provide accuracy in analysis, the sweep of the indicator is at all times synchronized with the actual rotational position of the engine crankshaft by means of a two-phase sweep generator directly controlled from the engine crankshaft.

Although this synchronization of the actual rotational position of the engine crankshaft with the two-phase sweep generator has been illustratively shown as being a mechanical coupling, it is not intended to limit the mode or means of synchronization thereto but to include as well other means by which substantially continuous synchronization may be obtained for any rotational position of the engine crankshaft.

In Fig. 1 there is illustrated a preferred embodiment of the present engine power analyzer as used in a craft having an internal combustion engine of the four stroke cycle spark ignition type. An inherent feature of the said analyzer is the synchronization of a circular electron beam sweep with the rotation of the crankshaft of the engine. To obtain exact synchronism with engine rotation a two-phase sine wave generator 21 is directly coupled to the crankshaft 20 of the engine.

In cases of four stroke cycle engines, this mechanical coupling is made by means of gear train 22 having a two to one step-down gear ratio so that one revolution of generator 21 occurs for each complete four stroke cycle of the craft engine. The sine wave voltage output of phase generator 21 is fed through capacitor type filters 23 and 23', in order to filter out any harmonics which may be present, to vacuum tube amplifiers 24 and 24', 25 and 25' whose electrical bias may be controlled by means of rheostats 26, 26', respectively, included in the cathode circuit of amplifiers 24, 24', 25 and 25'. The voltage outputs from the amplifiers above are directed to the horizontal plates 40, 40' and the vertical plates 41, 41' of cathode ray tube oscilloscope 43. The gain of amplifiers 24, 24', 25 and 25' are controlled by means of rheostats 27 and 27'.

Thus, the amplitude of the A. C. voltages applied to the horizontal and vertical deflecting plates of the cathode ray tube are readily controllable and variable. Since the voltages applied to the deflecting plates are derived from two-phase generator, it is readily seen that the voltages appearing across plates 40, 40' will be out of phase by substantially 90° from the voltages which appear across plates 41, 41' of the cathode ray tube.

Operating voltages for amplifiers 24, 24', 25 and 25', as well as for cathode ray tube 43, are obtained from a conventional type power supply 28. Thus, when the said amplifiers and cathode ray tube are energized by the application of suitable filament and plate voltages and when generator 21 is rotated in synchronism with the engine crankshaft, a circular trace will be produced on screen 30 of cathode ray tube 43.

Since the amplitude and phase of the voltages applied to plates 40, 40', 41 and 41' of the cathode ray tube are readily adjustable, the oscilloscope beam which traces the circle on the face of cathode ray tube 43 will always have a predetermined position for any given crankshaft angle.

Thus, by determining or calibrating the face 30 of cathode ray tube 43 for any given position, as by means of positioning generator 21, or altenatively by means of a calibrated transparent cylinder index disc 29, the crankshaft angle for any indication appearing along said circular trace is readily determinable.

By obtaining electrical signals indicative of ignition and/or other operative conditions for the engine of such craft and placing them on said sweep, a determination of where such event occurs during a crankshaft rotation is made available.

These electrical signals are routed to indicator 43, as by means of switch 50 having a plurality of selective contact points 55, 55', 55" each connecting indicator 43 to a voltage pick-up source, such as vibration pick-up 57. Pickup 57 may be any suitable device adapted to generate a signal in response to the vibration of or change of pressure within an engine cylinder. For example, the pressure indicating apparatus disclosed in Draper et al., 2,319,219 issued May 18, 1943, may be used for this purpose. Although only one pickup 57 is shown in this embodiment, it is understood that a separate pickup may be used for each cylinder from which information is to be obtained. In a similar manner switch 50 may be connected to other components such as the spark plugs of the engine or to any special components or devices which may be driven by the engine crankshaft.

Intermediate between a voltage source, such as vibration pick-up 57, is amplifier 51 which is adapted to amplify voltage signals from such a source, prior to directing the same to a radial deflecting electrode 59 of cathode ray tube 43.

Amplifier 51 is a voltage amplifier consisting of a vacuum tube 62, which may be a pentode type tube. In actual construction, a plate supply voltage of approximately 450 volts is provided thereto through a plate load resistor 80 of approximately 20,000 ohms. The voltage applied to screen grid 81 of tube 62 is approximately 200 volts. To control the input voltage level to radial deflecting electrode 59, a potentiometer 67 is provided to adjust the gain of vacuum tube 62.

Radial deflection of the cathode ray beam can only occur when sufficient voltage from the outside voltage pick-up source is present, i. e., when some event creating a sufficient voltage is present and is applicable to radial deflecting electrode of cathode ray tube 43.

It is known that for any internal combustion engine specific events such as combustion will produce signals of such magnitude in a detonation pick-up only at one specific crankshaft angle. It follows, therefore, that a radial sweep is provided which will always give a definite position on the cathode ray tube for that crankshaft angle. Further, a combustion signal from the detonation pick-up will always appear at that specific point or angle as viewed on the oscilloscope screen. On all other cylinders, the combustion event will occur at a definite position depending upon the crankshaft angle at which combustion takes place on the particular cylinder.

As the events from all cylinders or from a complete rotation of other devices, appear on the screen 30 of the oscilloscope tube as shown in Fig. 2, identification of crankshaft angular position or cylinder motion arranged in firing order may be used to identify specific events.

A particular advantage of this means of presentation is that comparison of the various vibrations is readily possible which allows abnormalities to be quickly located.

Another important advantage is that for infrequently occurring irregularities or for irregularities which occur only once, detection is possible only if the observer can view all of the events all of the time and rapidly identify the abnormal event.

As stated, in order to adjust the amplitude of the radial deflection to a convenient and readily observable height, amplifier gain control 67 is provided. Provision is made in the power supply 28 for adjusting the intensity and focus by means of controls 80 and 81 respectively of the cathode ray tube 43. Also, as stated, rheostats 26 and 26′ are provided for centering the horizontal and vertical deflections so as to centralize the base circle on the cathode ray screen 43.

The function and/or uses of the power analyzer as detailed above, are merely illustrative and not exhaustive, and since many changes can be made in the above structure and many apparently widely different embodiments of the inventions can be made without departing from the scope thereof, it is intended that all matter contained in the above description or shown in the accompanying drawings shall be interpreted as illustrative and not in a limiting sense.

What is claimed is:

1. A multi-cylinder engine analyzing device comprising a cathode ray tube including a fluorescent screen and means to produce an electron beam in the tube, generating means actuated by the engine being analyzed to generate signals to deflect the electron beam to form a circular trace on the screen whereby the electron beam is rotated in synchronism with the engine, means responsive to the firing of each cylinder during each cycle of operation of the engine to generate a signal at each firing, biasing means operable by such signals to vary the radius of the circular trace, means to impress said signals on the biasing means, and means to identify each biased trace with the firing of the corresponding cylinder of the engine.

2. A multi-cylinder engine analyzing device comprising a cathode ray tube including a fluorescent screen and means to produce an electron beam in the tube, generating means actuated by the engine being analyzed to generate signals to deflect the electron beam to form a circular trace on the screen whereby the electron beam is rotated in synchronism with the engine, means responsive to the firing of each cylinder during each cycle of operation of the engine to generate a signal at each firing, biasing means operable by such signals to vary the radius of the circular trace, and means to identify each biased trace with the firing of the corresponding cylinder of the engine.

3. A multi-cylinder engine analyzing device comprising a cathode ray tube including a fluorescent screen and means to produce an electron beam in the tube, generating means actuated by the engine being analyzed to generate signals to deflect the electron beam to form a circular trace on the screen whereby the electron beam is rotated in synchronism with the engine, means to detect the firing of each cylinder during each cycle of operation of the engine and to generate a signal at each firing, biasing means operable by an impressed signal to vary the radius of the circular trace, means to impress on the biasing means the signals generated by the detecting means, and a scale on the face of the cathode ray tube whereby each biased trace is identified with the firing of the corresponding cylinder of the engine.

4. A multi-cylinder engine analyzing device comprising a cathode ray tube including a fluorescent screen and means to produce an electron beam in the tube, generating means actuated by the engine being analyzed to generate signals to deflect the electron beam to form a circular trace on the screen whereby the electron beam is rotated in synchronism with the engine, pressure sensitive means to generate a signal in response to pressure changes during the combustion period of each cylinder in each engine cycle, biasing means operable by an impressed signal to vary the radius of the circular trace, means to impress on the biasing means the signals generated by the pressure sensitive means, and means to identify each biased trace with the cylinder in which the corresponding pressure change occurs.

5. A multi-cylinder engine analyzing device comprising a cathode ray tube including a fluorescent screen and means to produce an electron beam in the tube, generating means actuated by the engine being analyzed to generate signals to deflect the electron beam to form a circular trace on the screen whereby the electron beam is rotated in synchronism with the engine, pressure sensitive means to generate a signal in response to pressure changes during the combustion period of each cylinder in each engine cycle, biasing means operable by an impressed signal to vary the radius of the circular trace, means to impress on the biasing means the signals generated by the pressure sensitive means, and a calibrated index on the face of the cathode ray tube whereby each biased trace is identified with the cylinder in which the corresponding pressure change occurs.

FRANK L. RICHARDSON.
PAUL R. CRONIN.

REFERENCES CITED

The following references are of record in the file of this patent:

UNITED STATES PATENTS

| Number | Name | Date |
|---|---|---|
| 2,085,203 | Schlesman et al. | June 29, 1937 |
| 2,121,359 | Luck et al. | June 21, 1938 |
| 2,202,900 | Draper | June 4, 1940 |
| 2,319,219 | Draper et al. | May 18, 1943 |
| 2,355,363 | Christaldi | Aug. 8, 1944 |
| 2,366,355 | Van B. Roberts | Jan. 2, 1945 |
| 2,392,581 | De Juhasz | Jan. 8, 1946 |
| 2,534,276 | Lancor | Dec. 19, 1950 |

FOREIGN PATENTS

| Number | Country | Date |
|---|---|---|
| 107,518 | Australia | June 4, 1937 |